United States Patent [19]
Turner

[11] Patent Number: 5,377,762
[45] Date of Patent: Jan. 3, 1995

[54] BORE SELECTOR

[75] Inventor: Edwin C. Turner, Houston, Tex.

[73] Assignee: Cooper Industries, Inc., Houston, Tex.

[21] Appl. No.: 15,487

[22] Filed: Feb. 9, 1993

[51] Int. Cl.$^6$ .............................................. E21B 34/10
[52] U.S. Cl. ................................... 166/339; 166/341; 166/347; 166/320
[58] Field of Search ............... 166/316, 320, 321, 324, 166/331, 339, 341, 344, 347, 356; 285/18

[56] References Cited

U.S. PATENT DOCUMENTS

| | | | |
|---|---|---|---|
| 1,951,434 | 3/1934 | Needham . | |
| 2,586,144 | 2/1952 | Benoit . | |
| 2,752,944 | 7/1956 | Temple . | |
| 3,482,601 | 12/1969 | Drouin | 166/344 X |
| 3,664,376 | 5/1972 | Watkins . | |
| 3,834,418 | 9/1974 | Clancy . | |
| 4,133,418 | 1/1979 | Van Bilderbeek | 166/153 |
| 4,223,700 | 9/1980 | Jones . | |
| 4,252,149 | 2/1981 | Dollison | 166/70 |
| 4,291,724 | 9/1981 | Miller | 166/70 |
| 4,333,531 | 6/1982 | Lawson | 166/344 X |
| 4,637,470 | 1/1987 | Weathers et al. | 166/344 |
| 4,655,289 | 4/1987 | Schoeffler | 166/320 |
| 4,658,904 | 4/1987 | Doremus et al. | 166/336 |
| 4,770,247 | 9/1988 | Wilkins | 166/341 |
| 5,129,459 | 7/1992 | Breese et al. | 166/339 |

Primary Examiner—Roger J. Schoeppel
Attorney, Agent, or Firm—David A. Rose

[57] ABSTRACT

The bore selector includes a housing with an upper end having at least a first bore and a lower end with at least second and third bores. The housing includes a central bore extending between the upper and lower ends. A tube has its upper end connected to the first bore and its lower end adjacent the second and third bores. A yoke having an aperture therethrough for passing the tube, is reciprocably mounted within the bore of the housing. The yoke includes cam slots receiving guide lugs projecting from the sides of the tube. A hydraulic actuating means is also mounted in the lower end of the housing for reciprocating the yoke whereby as the yoke is reciprocated within the housing, the guide lugs move within the cam slots to shift the lower end of the tube between the second and third bores. A cage is mounted within the lower end of the housing to ensure alignment and sealing engagement between the lower end of the tube and the face of the housing around the second and third bores.

18 Claims, 6 Drawing Sheets

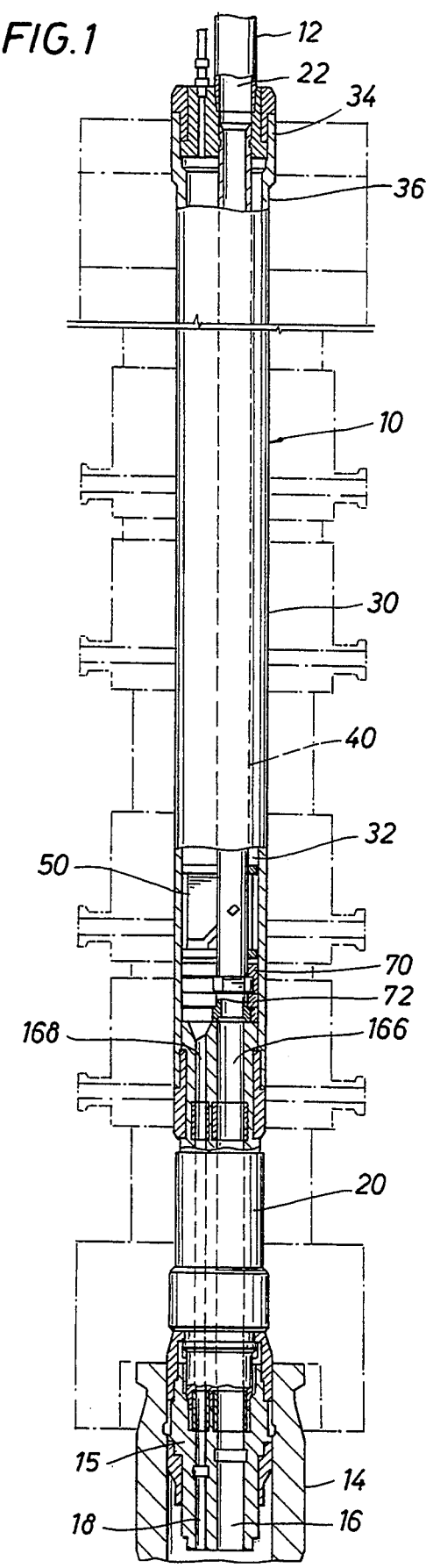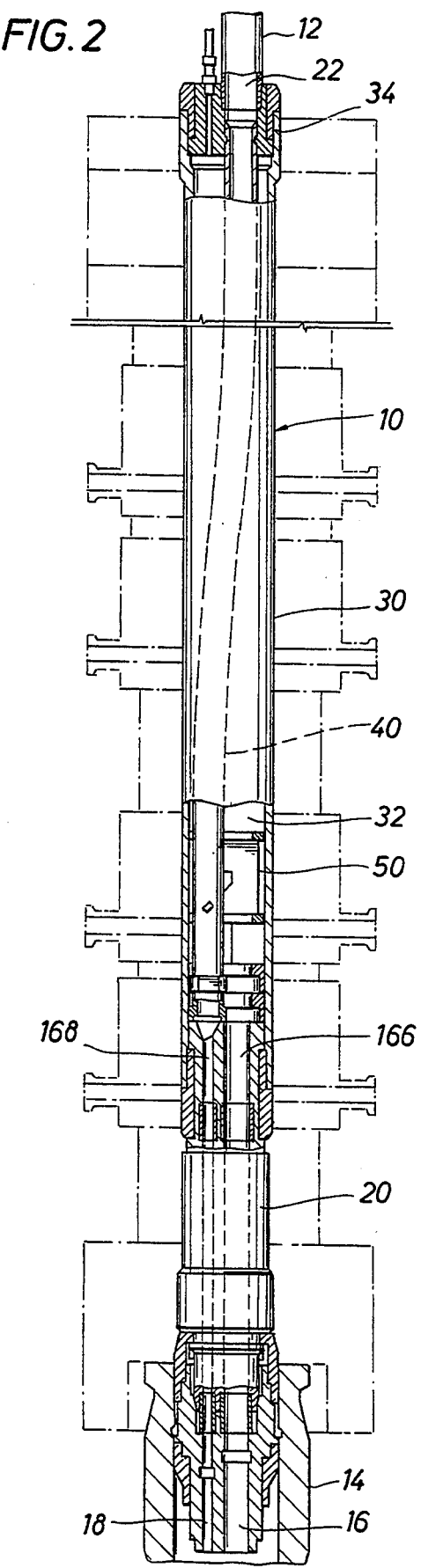

FIG. 3
FIG. 4
FIG. 3A
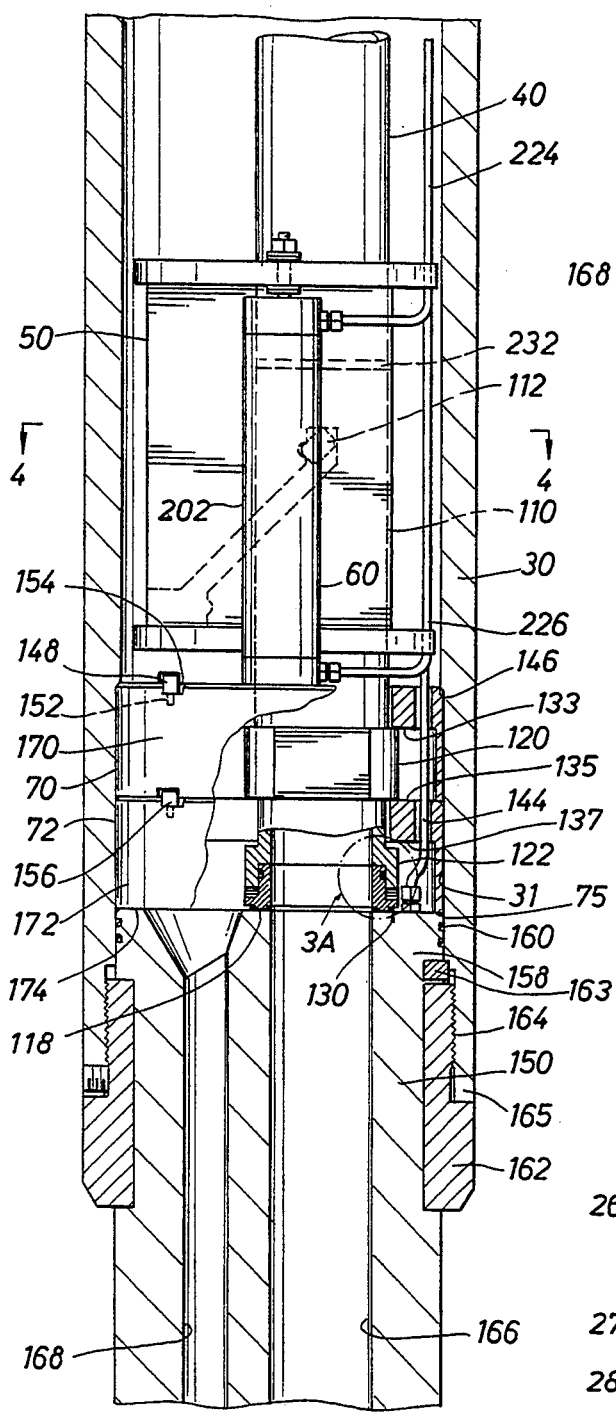
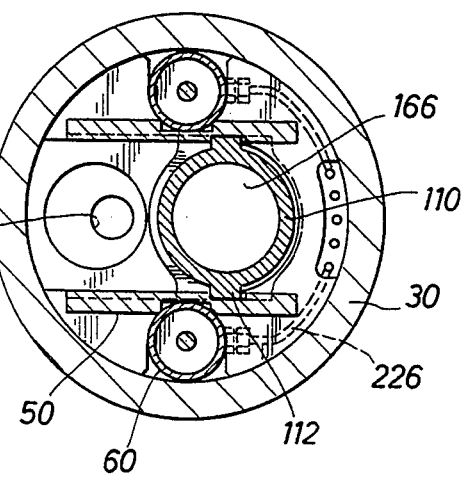
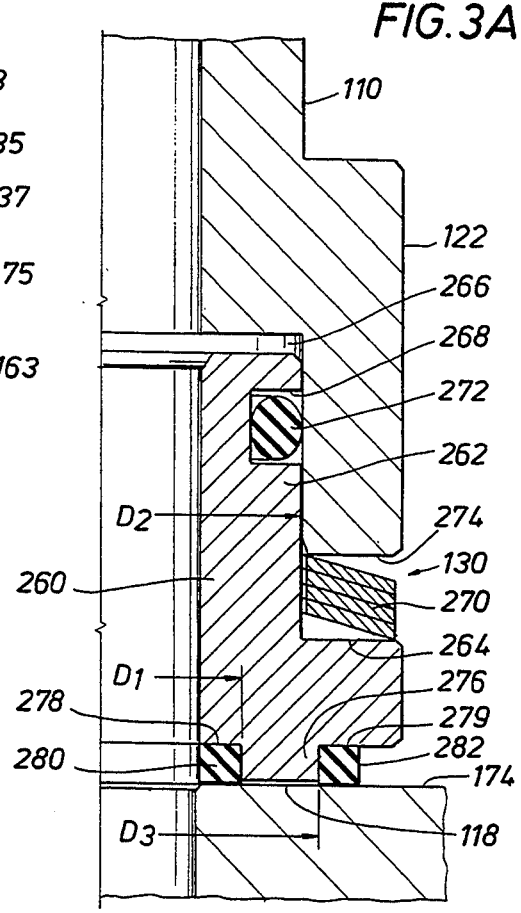

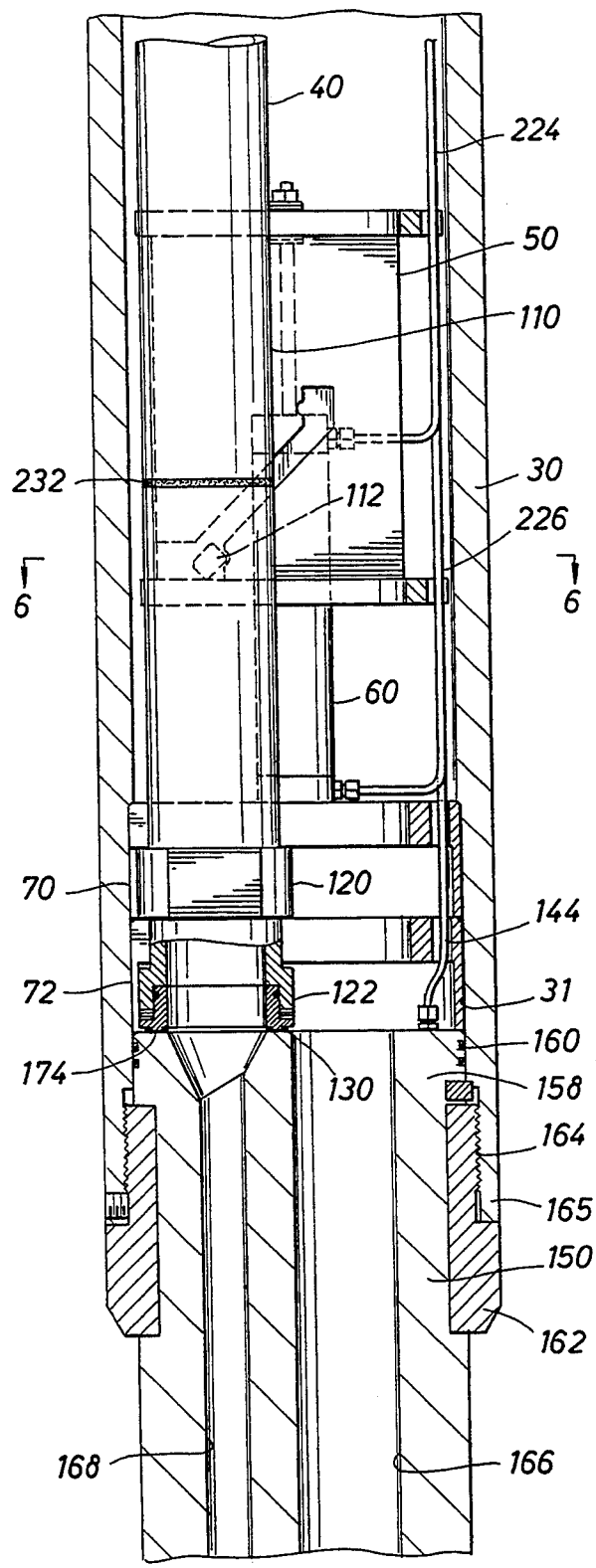
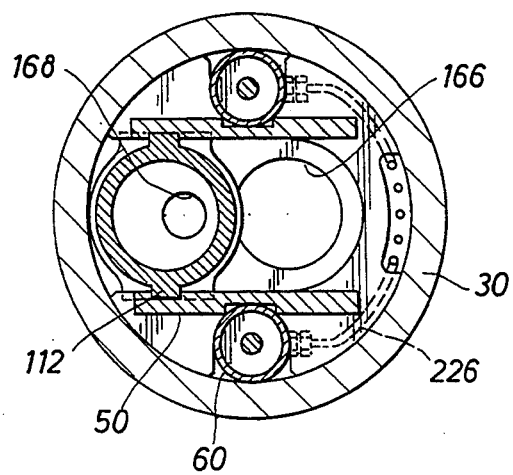
FIG. 5
FIG. 6

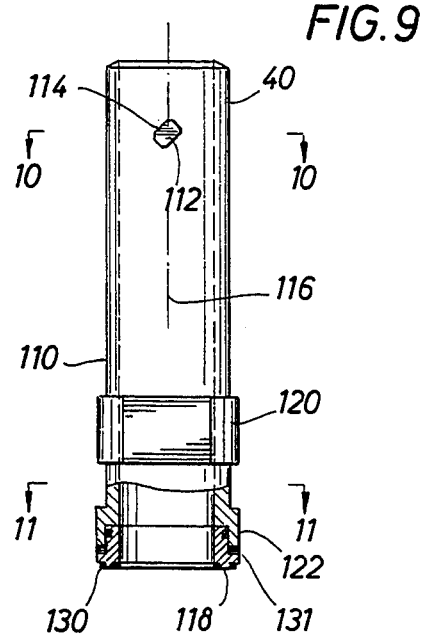
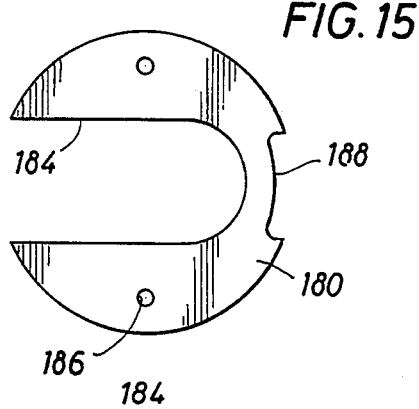
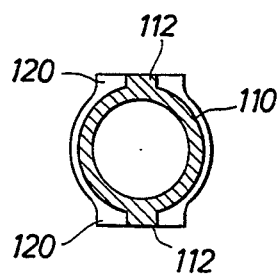
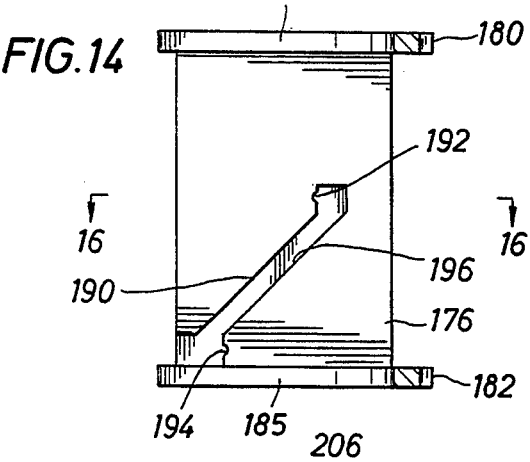
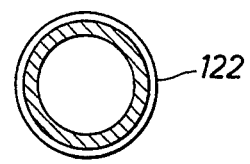
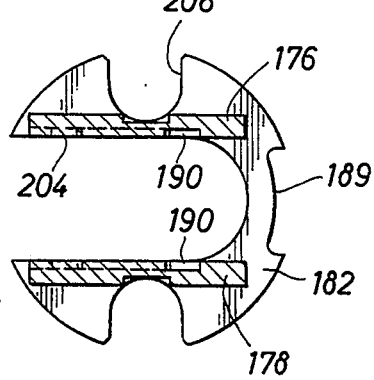
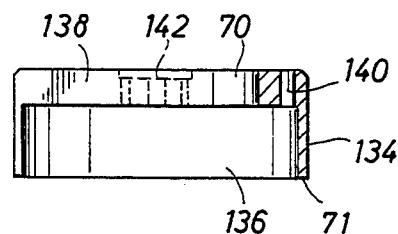
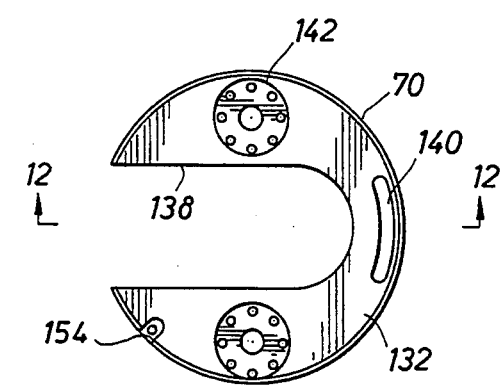

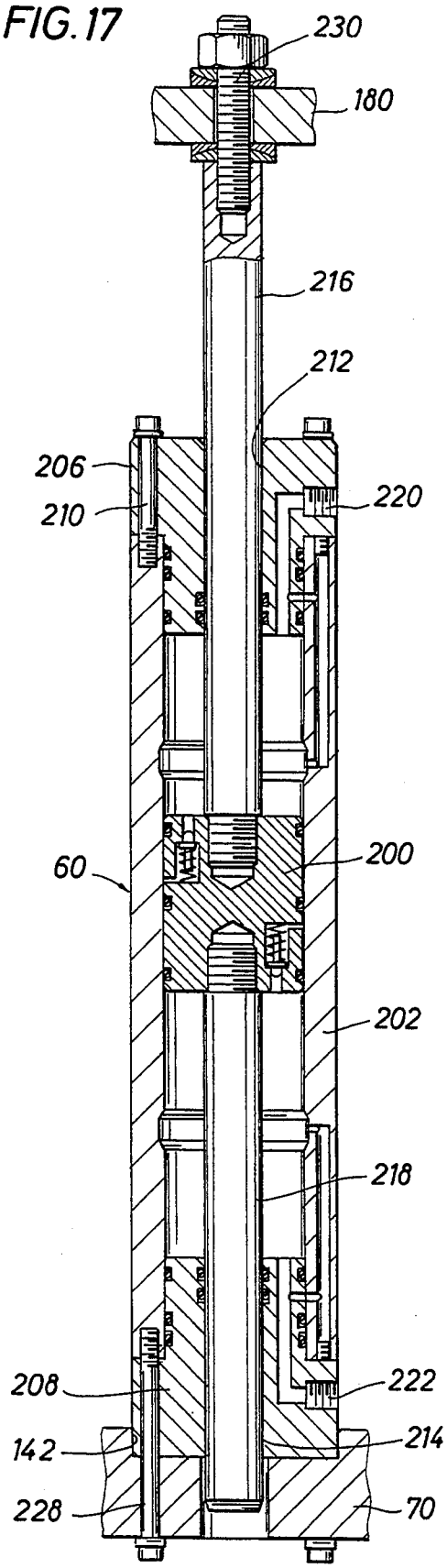
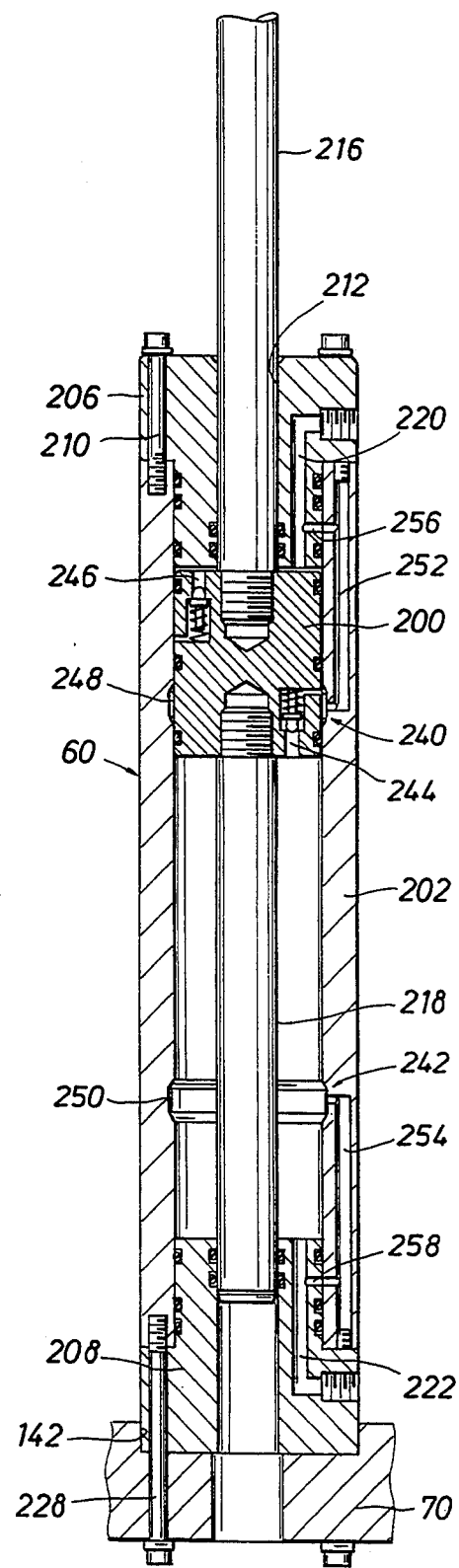
FIG. 17
FIG. 18

BORE SELECTOR

BACKGROUND OF THE INVENTION

The present invention relates generally to subsea wells having multiple tubing strings or bores extending into the bore hole from a wallhead and with a riser extending to the water surface, and more particularly, to a bore selector disposed between the riser and wellhead for providing selective access between the riser and one of the individual bores.

Subsea wells with multiple bores have one or more tubing or production strings suspended from a wellhead. A riser extends from the wellhead to a platform at the surface. Oftentimes it is necessary to have access to individual bores for extending a wire line tool from the surface into one of the bores. The riser includes multiple strings of riser pipe extending to the surface typically with individual riser strings for each bore. However, individual riser strings are very expensive. Many times these risers must be specially built to allow access to each of the individual bores.

A dual bore selector selects either the bore for production or the bore to the annulus in a dual bore completion. The dual bore selector is either connected above a tubing hanger running tool or is tied back into the christmas tree, depending on whether you are performing a workover. A specialty riser is constructed which includes two casing strings side by side to tie back and communicate with the dual bores. The riser is used to perform the initial completion and the workover. Such specialty risers are quite expensive and specialty risers in 45 foot sections for deep water may cost millions of dollars just for the risers. Thus, it is preferred to only have one riser string extending to the surface thereby eliminating the other string to reduce cost.

U.S. Pat. No. 4,770,247 discloses a multiple bore well having a riser with a bore selector. The selector is connected at its lower end to a sub sea wellhead supporting multiple tubing strings for completion and workover operations. The selector is connected at its upper end to the lowest section of the riser string extending to the surface. The selector includes an upper tubular member having a single bore in flow communication with the riser string, a lower member having multiple bores which align with the multiple bores of the subsea wellhead, and an intermediate section having a rotary portion which communicates with the single upper born and selectively communicates with each of the individual lower multiple bores as the intermediate section is rotated.

Various prior art patents disclose flowline switches or selectors. U.S. Pat. Nos. 4,133,418; 4,223,700; 4,291,724; and 5,129,459 disclose a flowline switch or selector having a housing with a rotor mounted therewithin to rotate a tubular passageway extending through the rotor so as to connect an upper port to one of a plurality of ports at its lower end. U.S. Pat. No. 5,129,459 reciprocates and indexes the rotor tube up and down thereby rotating the tube between various lower ports as the rotor tube rotates within the housing.

There are also several different types of diverters and diverter valves for selecting between two conduits. U.S. Pat. Nos. 2,752,944 and 3,664,376 illustrate push-pull type diverters with a horizontally reciprocating piston; U.S. Pat. Nos. 1,951,434 and 4,252,149 disclose flapper type diverters having pivoting diverter members; and U.S. Pat. Nos. 2,586,144 and 3,834,418 show diverters having flexible members which are selectively moved between two conduits.

The present invention overcomes the deficiencies of the prior art.

SUMMARY OF THE INVENTION

The bore selector of the present invention includes a housing with an upper end having at least a first bore and a lower end with at least second and third bores. The housing includes a central bore extending between the upper and lower ends. A tube has its upper end connected to the first bore and its lower end adjacent the second and third bores. A yoke having aperture therethrough for passing the tube, is reciprocably mounted within the bore of the housing. The yoke includes cam slots receiving guide lugs projecting from the sides of the tube. A hydraulic actuating means is also mounted in the lower end of the housing for reciprocating the yoke whereby as the yoke is reciprocated within the housing, the guide lugs move within the cam slots to shift the lower end of the tube between the second and third bores. A cage is mounted within the lower end of the housing to ensure alignment and sealing engagement between the lower end of the tube and the surface surrounding the second and third bores.

Other objects and advantages of the present invention will become apparent from the following description.

BRIEF DESCRIPTION OF THE DRAWINGS

For a detailed description of the preferred embodiment of the invention, reference will now be made to the accompanying drawings wherein:

FIG. 1 is an elevation view, partly in section, of the bore selector attached to a riser at its upper end and to a running tool and wellhead at its lower end with the bore selector being shown communicating with the production bore of the wellhead;

FIG. 2 is the bore selector of FIG. 1 with bore selector being shown communicating with the annulus bore of the wellhead;

FIG. 3 is a cross-sectional elevation view of the lower end of the bore selector mounted to the upper end of the tubing hanger running tool and showing the yoke, cage and hydraulic actuator for the tube extending through the housing of the bore selector;

FIG. 3A is an enlarged cross-sectional view of detail A shown in FIG. 3 illustrating the floating seal on the lower terminal end of the tube;

FIG. 4 is a cross-sectional view at plane 4—4 in FIG. 3 of the yoke, hydraulic actuator, and tube of the bore selector showing the yoke in its lowermost position with the tube communicating with the production bore of the wellhead;

FIG. 5 is a cross-sectional elevation view of the bore selector with the hydraulic actuator having moved the yoke to its uppermost position with the tube communication with the annulus bore of the wellhead;

FIG. 6 is a cross-sectional view at plane 6—6 in FIG. 5 showing the tube shifted into communication with the annulus bore as shown in FIG. 5;

FIG. 9 is an elevation view of the guide end of the tube of the bore selector;

FIG. 10 is a cross-sectional view at plane 10—10 of FIG. 9;

FIG. 11 is a cross-sectional view at plane 11—11 of FIG. 9;

FIG. 12 is a cross-sectional elevation view of the cage of the bore selector;

FIG. 13 is a top view of the cage shown in FIG. 12;

FIG. 14 is a cross-sectional elevation view of the yoke of the bore selector;

FIG. 15 is a top view of the yoke shown in FIG. 14;

FIG. 16 is a cross-sectional view at plane 16—16 of FIG. 14 showing the bottom plate of the yoke;

FIG. 17 is a cross-sectional elevation view of the hydraulic actuating means of the bore selector; and FIG. 18 is the cross-sectional elevation view of FIG. 17 with the hydraulic actuating means in the uppermost position.

DESCRIPTION OF THE PREFERRED EMBODIMENT

Figure 7:
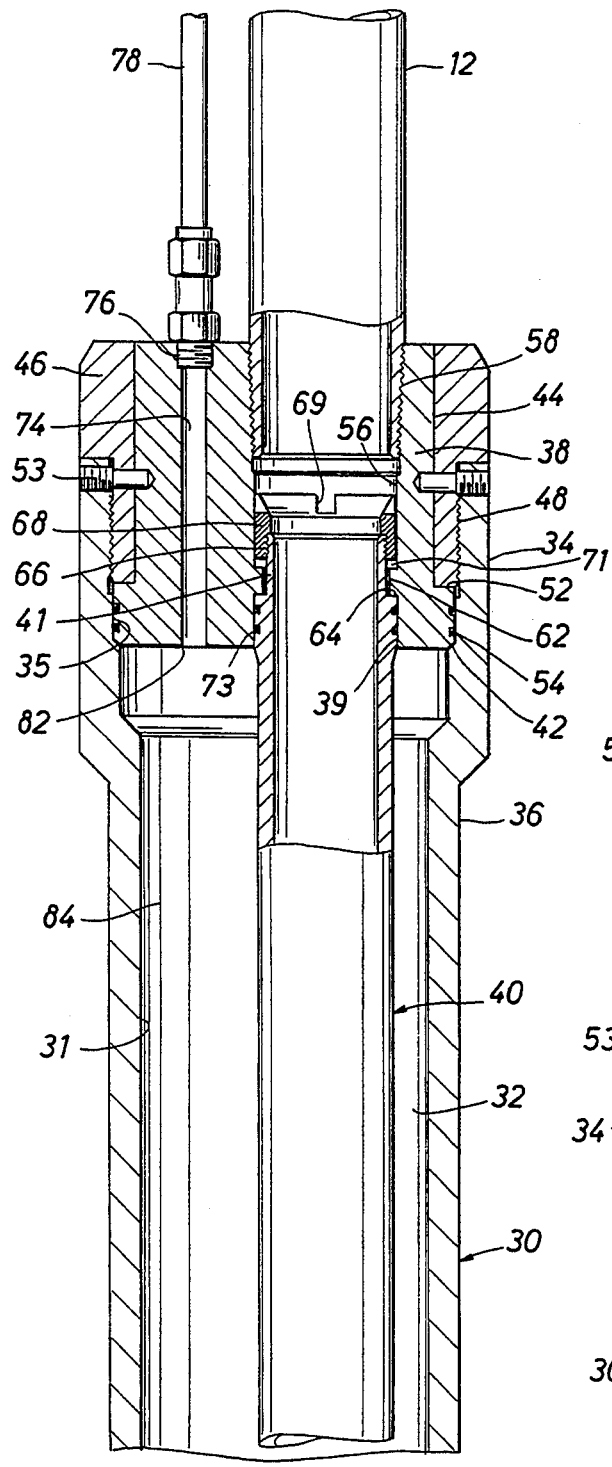
FIG. 7 is a cross-sectional elevation view of the upper end of the bore section showing the selector attached to coiled tubing and a riser extending to the surface.

Referring initially to FIG. 1, there is shown the bore selector 10 of the present invention. Although the bore selector may be used for communicating any upper bore with one or more lower bores, the bore selector 10 of the present invention is preferably used in the oil field for subsea wells to connect a riser 12, extending to the waters surface, to a subsea wellhead 14 having multiple bores extending downhole. As disclosed in U.S. Pat. No. 4,770,247, incorporated herein by reference, riser 12 includes a plurality of pipe sections which are connected end to end to form a riser string which extends from the subsea wellhead 14 to the water's surface. The bore selector 10 is used with multiple bore wells, such as wells having multiple bore tubing hangers or christmas trees utilizing multiple tubing strings. In the embodiment shown in the Figures, the multiple well includes two bores and thus selector 10 is shown as a dual bore selector. A tubing hanger 15 is supported within wellhead 14, as shown in FIG. 1, and includes a production bore 16 and a annulus bore 18 extending downhole. The lowest section of the casing string used for riser 12 is connected to the upper end of dual bore selector 10 and the lower end of dual bore selector 10 is connected to a tubing hanger running tool 20 connected to wellhead 14. In the present invention, the dual bore selector 10 is run through a drilling riser to run or tie back to a tubing hanger 15 or a christmas tree for the purpose of performing downhole operations.

The function of dual bore selector 10 is to provide communication between the bore of riser 12 and one of the multiple bores extending downwardly into the well, such as production bore 16 or annulus bore 18, for completion and workover operations. The dual bore selector 10 acts essentially like a valve and is used to select one bore or the other. One purpose for selecting a bore is to install a wire line blanking plug. A blanking plug has a fairly large outside diameter and is several feet long. The blanking plug or slick line plug is lowered by wire line and may be run through selector 10 into either the production bore 16 or the annulus bore 18.

The dual bore selector 10 includes a housing 30, which is preferably a tubular member having a central bore 32 therethrough, and conduit member 40, such as a tubular member or tube housed within the central bore 32 of housing 30. The housing 32 may be designed to withstand pressures up to 50,000 psi depending upon inside and outside diameter and the material of housing 32. Tube 40 includes a long flexible tubular member, approximately 30 feet long, which is preferably made of steel but may be made of titanium to shorten the length of tube 40. Tube 40 is designed for the same working pressure (internally and externally) as the tubing hanger, christmas tree and blowout preventer stack. Tube 40 is fixed at the top and allowed to shift at the bottom by flexing and bending elastically within housing 30 as the lower terminal end of tube 40 is moved from one bore to the other. As best shown in FIG. 3, dual bore selector 10 further includes a yoke 50 for shifting the lower end of tube 40 between production bore 16 and annulus bore 18, hydraulic actuator means 60 for reciprocating yoke 50, and a pair of upper and lower cages 70, 72 for positioning and sealing the lower end of tube 40.

Referring now to FIGS. 1 and 7, the upper end 36 of housing 30 includes suitable means, such as a threaded box 34, for connecting housing 30 to the lower section of the casing string of riser 12. An adapter 38 is supported within threaded box 34 by an upwardly facing, downwardly tapering annular shoulder 42. The adapter 38 includes a reduced diameter portion 44 at its upper end to form an annular space for receiving a connecting nut 46 which threadingly engages threads 48 of box 34 to bear against upwardly facing annular shoulder 52 of adapter 38. Lock screws 53 are received by aligned apertures in box 34, connecting nut 46, and adapter 38 to prevent connecting nut 46 from disengaging.

Adapter 38 includes external annular grooves receiving sealing means 54, such as a pair of O-rings, which sealingly engage the internal annular wall 35 of box 34. Adapter 38 further includes a riser bore 56 therethrough having upper threads 58 for threadingly engaging the pin of the lower section of riser 12. A reduced diameter annular rib 62 projects inwardly adjacent the lower end of bore 56 to form upper and lower facing annular shoulders. The upper end of tube 40 includes a reduced diameter portion 41 forming an upwardly facing annular shoulder 64 which engages the downwardly facing annular shoulder of rib 62. The reduced diameter portion 41 of tube 40 is threaded at 66 to threadingly engage a rotation nut 68 which acts as a stop against the upwardly facing shoulder of rib 62 to prevent excess buckling of tube 40 and also allow foreshortening of tube 40. The small gap left between rib 62 and retainer nut 68 allows limited buckling of tube 40. Buckling is caused by the large force due to the eccentrically loaded column. The buckling may foreshorten tube 40. Slots 69 are also provided in retainer nut 68 for a spanner wrench. Annular grooves are provided in the upper end of tube 40 to receive sealing means 73, such as a pair of O-rings, for sealingly engaging the annular wall 39 of adapter 38.

Adapter 38 further includes a second bore 74 extending therethrough which is parallel to riser bore 56. Connection means 76, such as a straight thread and O-ring by flareless tubing, are provided at the upper end of bore 74 for connecting a length of coiled tubing 78 which extends to the surface. The lower end 82 of bore 74 is in open communication with the annulus 84 formed between tubing 40 and the inner annular wall 31 of housing 30 with annulus 84 being sealed by sealing means 54, 73 of adapter 38. Fluids from the well can pass up through the annulus bore 18 and into coiled tubing 78 at the top of housing 30. Another option is to include a valve (not shown) in housing 30 that allows returns to pass up the choke and kill line (not shown).

Figure 8:
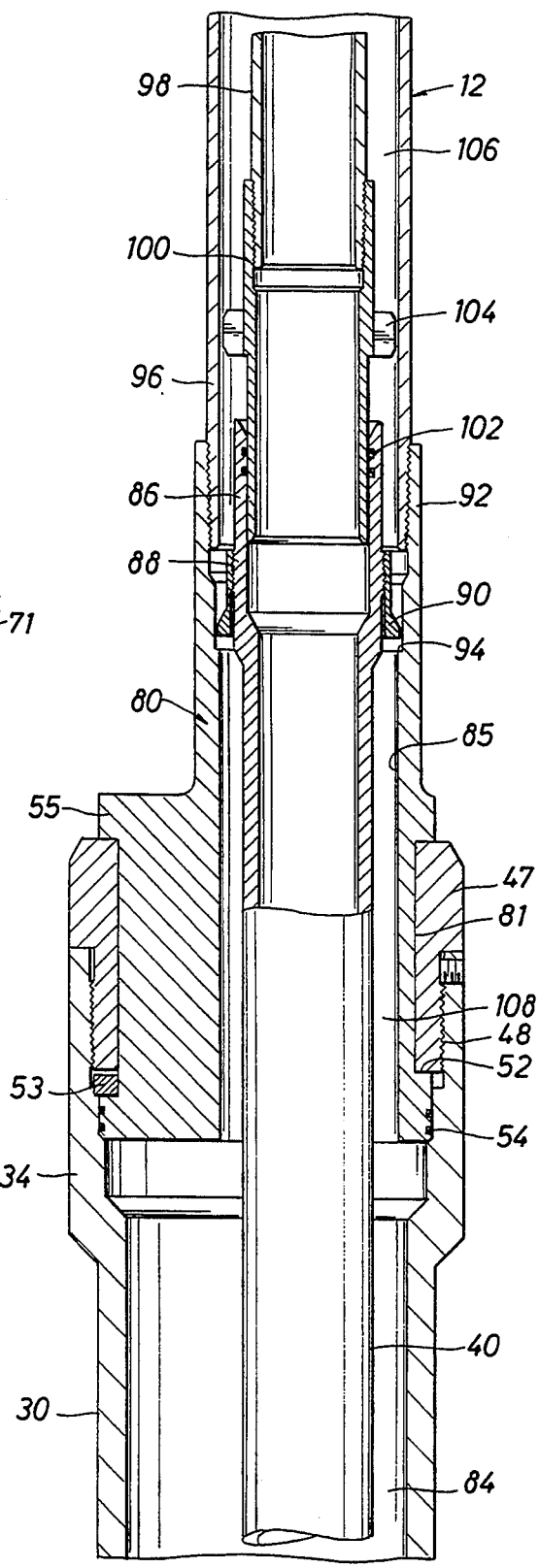
FIG. 8 is a cross-sectional elevation view of the upper end of the bore selector connected to concentric risers extending to the surface.

Referring now to FIG. 8, there is shown an alternative embodiment of the riser adapter 38 of FIG. 7 where concentric string risers having tubing 98 inside casing 96 extend to the surface. Riser adapter 80 shown in FIG. 8 does not include a bore therethrough for connection and communication with coiled tubing. The lower end of riser adapter 80 includes a reduced diameter portion 81 forming an annular recess which receives a split connecting nut 47. Connecting nut 47 is initially a split part which is received within recess 81 and then welded together. External threads 48 threadingly engage the box 34 of housing 30 and the connection is sealed in a manner substantially the same as that shown with respect to riser adapter 38 of FIG. 7. A pin 53 is press fit into an internal diameter slot in box 34. Pin 53 prevents rotation of adapter 80 with respect to housing 30. Adapter 80 in housing 30 transmits torque to the tubing hanger running tool 20 or to the christmas tree.

Riser adapter 80 includes a single bore 85 extending therethrough for receiving the upper end of tube 40 which includes a box 86 having external threads 88 for threaded engagement with a support collar 90. The upper end of riser adapter 80 includes a box 92 having an upwardly facing shoulder 94 for engaging and supporting support collar 90 to prevent excess buckling and also allow the foreshortening of tube 40. Collar 90 is fluted to allow the passage of fluids. An outer riser pipe or casing 96 includes a pin threadingly engaging the box 92 of riser adapter 80. An inner riser pipe or tubing 98 is threadingly connected to a sub 100 which is slidingly received within the box 86 of tube 40. Internal grooves are provided in box 86 to receive elastomeric seals 102, such as O-rings, for sealingly engaging the external annular wall of sub 100. Centering guides 104 are provided on sub 100 for centering internal riser string 98 within outer riser string 96. Guides 104 also allow fluid bypass. Inner and outer strings 98, 96 respectively form an annulus 106 which communicates with the annulus formed by the upper end of tube 40 and the annular wall 85 of riser adapter 80. Thus annulus 106 communicates with annulus 84 formed between tube 40 and housing 30.

Referring now to FIGS. 3, 9, 10 and 11, the lower end of tube 40 includes a guide end 110 welded at 232 to a straight length of pipe forming the upper portion of tube 40. Guide end 110 includes a pair of keys or guide lugs 112 projecting from opposite sides of guide end 110. Guide lugs 112 include parallel cam surfaces 114 preferably at 45 degrees from the vertical flow axis 116 of tube 40 although such angle may vary due to friction and pressure. Adjacent the lower terminal end 118 of tube 40 are spaced apart guide wings 120. As best shown in FIG. 10, the outer radial surfaces of guide lugs 112 and guide wings 120 are parallel in the same vertical plane. The lower terminal end 122 of guide 110 has an enlarged diameter. The lower terminal downwardly facing end 118 includes sealing means 130 hereinafter described in further detail.

Referring now to FIGS. 3, 12 and 13, a pair of upper and lower cages 70, 72, respectively, are disposed in the lower end of housing 30. Referring particularly to FIGS. 12 and 13, upper cage 70 includes a generally circular cover 132 having downwardly extending annular sides 134 forming a cylindrical cavity 136. Cover 132 includes a U-shaped aperture 138 and arcuate aperture 140. U-shaped aperture 138 acts as a guide slot for the lower guide end 110 of tube 40 and arcuate aperture 140 receives a plurality of hydraulic control lines 144 shown in FIG. 3 for downhole equipment such as subsurface safety valves. A pair of counterbores 142 are provided on each side of U-shaped aperture 138 for receiving and attaching the lower end of hydraulic actuating means 60 as hereinafter described. The cylinders 202 are fixed to upper cage 70 with the cover 132 of cage 70 affixed to a transition joint 150 hereinafter described.

It is preferred that there be two cages 70, 72 as shown in FIG. 3. A single cage could be used but would not allow the use of a "floating" type face seal means 130, hereinafter described. Upper and lower cages 70, 72 are nested against downwardly facing annular shoulder 146 of housing 30. An alignment cylinder 148 is affixed to cover 132 by a bolt 152. Cylinder 148 includes a drilled hole and counterbore to receive the shaft and head of bolt 152 respectively. Cylinder 148 is housed in milled slots 154, 156 cut in the tops of covers 132. A milled slot (not shown) is also provided in housing 30 to accommodate cylinder 148. Upon assembly, alignment cylinders 148 housed in the milled slots maintain alignment amongst U-shaped apertures 138 and first and second bores 166, 168 hereinafter described. Upper cage 70 bears against downwardly facing annular shoulder 146 with lower cage 72 bearing against the lower annular terminal end 71 of upper cage 70.

A transition joint 150, projecting from the upper end of tubing hanger running tool 20 or a christmas tree running tool, bears against the lower annular terminal end 75 of lower cage 72. Transition joint 150 will have different configurations depending upon bore spacings, control lines and whether the bore selector 10 is used to run a tubing hanger or a christmas tree. Transition joint 150 includes an upper annular flange 158 having seals 160 which sealingly engage the interior wall 31 of housing 30. Flange 158 forms an annular area for receiving a threaded retainer nut 162 threadingly engaging the threads 164 of lower box 165 of housing 30. Retainer nut 162 is assembled like that of retainer nut 47 shown and described with respect to FIG. 8. Transition joint 150 includes a first bore 166 therethrough communicating with the production bore 16 in the tubing hanger 15 within wellhead 14 and a second bore 168 passing therethrough which communicates with the annulus bore 18 in the tubing hanger 15 within wellhead 14.

Referring now to FIGS. 3, 4, 10 and 11, upon assembly, upper and lower cages 70 and 72, form a guide slot 170. Guide slot 170 is formed by the lower surface 133 of cover 132 of upper cage 70 and the upper surface 135 of cover 132 of lower cage 72. A gap 172 is formed by the lower surface 137 of cover 132 of lower cage 72 and the upwardly facing surface 174 of the upper terminal end of transition joint 150. Guide wings 120 on guide end 110 of tube 40 are disposed in guide slot 170 and lower enlarged diameter end 122 on guide end 110 is disposed within gap 172. A minimum of ten to fifteen thousandths clearance is provided between the bearing surfaces of wings 120 and the cover surfaces 133, 135 formed by guide slot 170. The bearing surfaces of wings 120 bear on the upper and lower surfaces 133, 135 of covers 132 on cages 70, 72 to hold down and align the downwardly facing lower terminal end 118 of tube 40 and maintain end 118 parallel with upwardly facing surface 174 of transition joint 150. Close tolerances may also be maintained. Wings 120 serve the same function as the head on a T-bolt, with covers 132 on the cage 70, 72 serving as T-slots. A moment is applied by guide slot 170 to guide wings 120 thereby maintaining terminal end 118 of tube 40 parallel to the top end of tube 40. Further, the double cages 70, 72 move the flexure point of tube 40 upward on the tube.

Tube 40 acts like a beam and is placed in pure cantilever causing the lower terminal end 118 of tube 40 to form a very small angle with upwardly facing surface 174. It is preferred to minimize the cantilever by fixing both ends of tube 40. The double cages 70, 72 and wings 120 minimize the angle at surface 174. It is also important to hold terminal end 118 square with surface 174 for sealing purposes.

The guide slot 170 and wings 120 hold the lower terminal end 118 of tube 40 down as tube 40 is shifted. The shifting of the lower terminal end 118 of tube 40 tends to raise end 118 off of upwardly facing surface 174 by a few thousandths of an inch. The bending and shifting of tube 40 from side to side adds stress to the long tube causing it to stretch. Also a given tolerance stackup of tube 40 may cause tube 40 to be longer. Thus, a small clearance is provided between lower terminal end 118 and upwardly facing surface 174 to flow for this lengthening of tube 40. Floating seal means 130 is designed to establish a seal across that clearance.

Referring now to FIGS. 3 and 3A, floating seal means 130 includes an annular shoe 260 having a reduced diameter portion 262 forming an upwardly facing annular shoulder 264 with reduced diameter portion 262 being received within a counterbore 266 within enlarged diameter portion 122 on the terminal end 274 of guide end 110 of tube 40. Reduced diameter portion 262 includes an outwardly facing groove 268 housing an elastomeric seal 272, such as an O-ring, which sealingly engages the inner annular wall of enlarged diameter portion 122 of guide end 110. Floating sealing means 130 further includes a plurality of Belleville spring washers 270 mounted around reduced diameter portion 262 and disposed between upwardly facing annular shoulder 264 and the downwardly facing annular terminal end 274 of enlarged portion 122. The downwardly facing terminal end 118 of shoe 260 includes a rib 276 forming inner and outer annular grooves 278, 279, respectively, for receiving inner and outer annular metal seal rings 280, 282, respectively. As shown in FIG. 3A, the thickness of seal rings 280, 282 is greater than the height of rib 276 such that metal seal rings 280, 282 form a metal-to-metal seal with the upwardly facing surface 174 of transition joint 150.

In operation, the stack of Belleville spring washers 270 preloads shoe 260 downwardly against upwardly facing surface 174 forming an initial seal between metal seals 280, 282 and surface 174. Washers 270 also permit sealing at low pressures. In addition to the preload of the Belleville spring washers 270, the internal and external pressures on shoe 260 and in the sealing engagement of metal tings 280, 282 with upwardly facing surface 174. There is a net downward force from internal pressures since the diameter $D_2$ of reduced diameter portion 262 is greater than the inside diameter $D_1$ of rib 276. There is a net downward force from external pressure due to the outside diameter $D_3$ of rib 276 being greater than the diameter $D_2$ of reduced diameter portion 262. The internal pressure acts upon the upper end of reduced diameter portion 262 and the external pressure acts upon the shoulder 264 of shoe 260. The force of Belleville spring washers 270 and the net downward force due to internal and external pressures cause metal seals 280, 282 to maintain a metal-to-metal seal with the upwardly facing surface 174 of transition joint 150. Sealing means 130 is designed to allow end 118 to float with respect to surface 174. Clearance is provided on the outside diameter which allows sealing means 130 to float angularly so that even if there is some misalignment of tube 40 or clearance with surface 174, sealing means 130 will accommodate for that misalignment and clearance and still maintain a seal.

Referring now to FIGS. 3, 14, 15 and 16, yoke 50 includes a pair of parallel side plates 176, 178 disposed between top plate 180 and bottom plate 182. Side plates 176, 178 preferably have aligned 45 degree cam slots 190 although the angle may vary depending upon friction and pressure. Cam slots 190 include an upper detent 192 and a lower detent 194 which serve as mechanical locking means for locking tube 40 in place and provide an indication at the surface that tube 40 is in position. The detents 192, 194 are recesses at each end of the cam slot 190. The lugs 112 are moved an eighth of an inch past center to lock lugs 112 into detents 192, 194. The tube 40 acts like a cantilever beam or spring to maintain lugs 112 in detents 192, 194. Guide slots 190 form bearing surfaces 196 which engage the beating surfaces 114 of guide lugs 112 on guide end 110 of tube 40. As the yoke 50 cams the lugs 112 along the 45° slot 190, they will move toward the centerline of the assembly and click into the detents 192, 194. The resistance to the bending of tube 40 causes lugs 112 to click into the detents.

Top plate 180 includes a U-shaped aperture 184 for receiving the lower end of tube 40. A pair of apertures 186 are provided on each side of U-shaped aperture 184 for hydraulic actuating means 60. A cutout 188 is provided for hydraulic lines 144 shown in FIG. 3. The bottom plate 182 also includes a U-shaped aperture 185 for receiving the lower end of tube 40. Likewise, bottom plate 182 includes a cutout 189 for hydraulic tubing 144. As distinguished from top plate 180, bottom plate 182 includes a pair of apertures 206 on each side of U-shaped recess 185 for receiving the hydraulic actuating means 60, as hereinafter described.

Referring now to FIGS. 3, 4, 17 and 18, the hydraulic actuating means 60 includes a pair of pistons 200 and cylinders 202, one on each side of yoke 50. Each cylinder 202 includes identical top and bottom plugs 206, 208 secured to its ends by fasteners such as bolts 210, 228. Top and bottom plugs 206, 208 include bores 212, 214, respectively. Each piston 200 includes an upper shaft 216 extending upwardly through aperture 212 and a lower shaft 218 extending through lower aperture 214. Plugs 206, 208 and piston 200 are appropriately sealed with the inner wall of cylinder 202 by sealing means, well known in the art, for containing the hydraulic fluid within cylinder 202. Hydraulic ports 220, 222 are connected to hydraulic lines 224, 226, best shown in FIG. 3, which extend to the surface to hydraulic controls for actuating hydraulic actuating means 60. Both pistons 200 and cylinders 202 are connected hydraulically in parallel such that only two control lines 224, 226 are required from the surface to actuate both piston and cylinders. The pistons 200 move together in parallel. The hydraulic fluid inputs into one cylinder with a tee going to the other cylinder.

Hydraulic actuating means 60 also includes upper and lower hydraulic fluid release means 240, 242, respectively. Referring particularly to FIG. 18, piston 200 includes a lower relief valve 244 as a part of upper hydraulic fluid release means 240 and an upper relief valve 246 as a part of lower hydraulic fluid release means 242. Cylinder 202 includes an upper and lower relief groove 248,250 which is in fluid communication with relief bores 252, 254, respectively. Upper and lower plugs 206, 208 include communication ports 256, 258, respectively which provides fluid communication between upper and lower hydraulic lines 220, 222 and relief lines 252, 254 in the cylinder wall of cylinder 202, respectively.

During the up stroke, hydraulic fluid pressure is placed in control line 226 below piston 200. The hydraulic pressure below piston 200 opens lower relief valve 244 with the spring of upper relief valve 246 causing upper relief valve 246 to be closed. The hydraulic fluid above piston 200 is vented through hydraulic line 220 into control line 224. As piston 200 reaches its uppermost position within cylinder 202, lower relief valve 244 becomes aligned with upper relief groove 248. The hydraulic pressure from control line 226 is then vented by by-passing piston 200 via relief line 252, port 256 and hydraulic line 220. The operation of hydraulic actuating means 60 is reversed during the down stroke. The venting of the hydraulic pressure provides an indication of the stroke of the piston 200. Further, relief valves 244, 246 reduce the number of hydraulic lines required for the hydraulic actuating means 60.

A dual shaft piston and cylinder is preferred for the hydraulic actuating means 60. A single shaft piston and cylinder is not pressure balanced and if exposed to pressure will have a tendency to return to its original position. A dual shaft piston is pressure balanced and if control lines leak or are exposed to annular pressure, there is no tendency for the yoke 50 to reciprocate so as to shift the tube 40 from side to side. If the tube 40 is connected to the production bore 16 and the annulus bore 18 communicates with the annulus 84 around the tube 40 in the housing 32, and if the annulus bore pressure is high enough to act across the diameter of a single shaft sticking out of the top plate of yoke 50, it could move the yoke 50 downward and shift the tube 40. A dual shaft piston balances any external pressure because the pressure acts equally both on the top and bottom shafts.

The lower end of cylinder 202 is received within counterbore 142 in cover 132 of upper cage 70. Cylinder 202 is affixed to upper cage 70 by fasteners such as bolts 228. The cylinder extends upwardly from the top of upper cage 70 through apertures 206 in bottom plate 182 of yoke 50. The upper shaft 216 of piston 200 abuts against the lower surface of top plate 180 of yoke 50 and is connected thereto by a fastener such as bolt 230. The cylinder 202 provides a dual function, it provides a guide to the stroke and reciprocation of yoke 50 and it also holds the yoke 50 from rotation within the housing 30. The motion of the yoke 50 does not cause it to have a tendency to rotate.

In the assembly of the dual bore selector 10, the guide tube 110 is welded at 232 shown in FIG. 3 to a length of pipe forming tube 40. Tube 40 is inserted into the U-shaped apertures 184, 185 of yoke 50. Likewise, tubing 40 is inserted into the U-shaped apertures 138 of upper and lower cages 70, 72. The hydraulic actuating means 60, and in particular cylinders 202, are mounted within apertures 206 adjacent each side plate 176 of yoke 50. The upper shaft 216 is bolted to the top of plate 180 of yoke 50 at aperture 186 and the lower end of cylinder 202 is inserted into counterbore 142 and bolted to the cover 132 of upper cage 70. This assembly is then inserted into the central bore 32 of housing 30 through the lower end of housing 30 until upper cage 70 engages downwardly facing annular support shoulder 146. Riser adapter 38 is then inserted over the upper end of tube 40 with lock nut 68 threadingly engaging the upper terminal end of tubing 40 whereby adapter 38 bears against upwardly facing annular shoulder 42 of housing 30. The dual bore selector 10 is then connected to the top of tubing hanger running tool 20 which supports a tubing hanger and string of tubing (not shown). As the tubing string is lowered into the well through the blowout preventer stack, sections of riser pipe 12 are added.

In operation, the dual bore selector 10 includes a first position shown in FIG. 1 whereby the tube 40 communicates with production bore 16 via bore 166 in transition joint 150. As shown in FIG. 3, yoke 50 is in its lowermost position with piston 200 also being in its lowermost position within cylinder 202. Guide lug 112 is housed in detent 192 at the uppermost location of 45 degree guide slot 190. Housing 30 is an extension of the annulus bore 18 if the tube 40 were aligned with the production bore 16 or it is the production bore 16 if the tube 40 is aligned with the annulus bore 18.

Referring now to FIG. 2, there is shown the dual bore selector 10 in another position with tube 40 in communication with annulus bore 18 via bore 168 in transition joint 150. To shift tubing 40 from production bore 16 to annulus bore 18, hydraulic actuating means 60 is actuated by hydraulic fluid passing into the lower portion of cylinder 202 below piston 200. Upon actuation of hydraulic actuating means 60, the piston 200 moves upwardly with upper shaft 216 as shown in FIG. 18 forcing yoke 50 upwardly into the position shown in FIG. 5. Upon the upward movement of yoke 50, guide lug 112 engages the 45 degree bearing surfaces 196 of guide slot 190. As guide lug 112 travels upward in guide slot 190, tubing 40 is forced to shift toward annulus bore 18. The lower end of tube 40 shifts approximately 5⅜ inches between the centerlines of bores 16, 18. Tube 40 within yoke 50 travels an additional distance forcing guide lugs 112 to travel past the centerline of annulus bore 118 and snapping into final alignment due to the stored energy in tube 40. As shown in FIG. 5, guide lug 112 is received by lower detent 194 with tube 40 aligned with annulus bore 18. Guide wings 120 on the lower end of tube 40 travel within guide slot 170 formed by upper and lower cages 70, 72. The engagement of guide wings 120 within guide slot 170 maintains the downwardly facing terminal end 118 of tube 40 parallel with the upwardly facing surface 174 of running tool 150. Floating seals 130 continuously sealingly engage the upwardly facing surface 174 of transition joint 150 to maintain sealed fluid connections with either production bore 16 or annulus bore 18.

While a preferred embodiment of the invention has been shown and described, modifications thereof can be made by one skilled in the art without departing from the spirit of the invention.

I claim:

1. A bore selector comprising:
   a housing having a first end with at least a first bore and a second end with at least second and third bores, said housing having a central bore extending between said first and second ends;
   a conduit member having a flow bore therethrough with a first terminus connected to said first end communicating said flow bore with said first bore and a second terminus adjacent said second end for communicating said flow bore with one of said second or third bores;

a yoke disposed within said central bore adjacent said second end and having an aperture therethrough for receiving said second terminus, said yoke being reciprocably mounted about said conduit member for reciprocation of said yoke with respect thereto;

a guide disposed on said yoke and about said conduit member for flexing and elastically bending said conduit member as said yoke reciprocates with respect to said conduit member and thereby flexing said conduit member to laterally shift said second terminus between a first position where said flow bore communicates with said second bore and a second position where said flow bore communicates with said third bore; and means for reciprocating said yoke to cause said guide to flex said conduit member between said first and second positions.

2. The bore selector of claim 1 wherein said guide includes a key mounted on said conduit member, said key being disposed within a cam slot in said yoke.

3. The bore selector of claim 2 wherein said cam slot forms 45 degree cam surfaces on said yoke for engaging 45 degree bearing surfaces on said key.

4. The bore selector of claim 2 wherein said cam slot includes detents for locking said key in said first and second positions.

5. The bore selector of claim 1 further including first and second cages disposed within said housing, said cages including bearing surfaces which engage sides of said conduit member to maintain said second terminus parallel with said second end.

6. The bore selector of claim 1 further including guide surfaces disposed within said housing and engaging bearing surfaces on sides of said conduit member for maintaining said second terminus in parallel relationship with said second end as said conduit member shifts from said first position to said second position.

7. The bore selector of claim 1 further including a seal member disposed on said second terminus for sealingly engaging said second end.

8. The bore selector of claim 1 wherein said reciprocating means includes a hydraulic actuator having one end affixed to said second end of said housing and another end affixed to said yoke.

9. A bore selector comprising:
a housing having a first end with at least a first bore and a second end with at least second and third bores, said housing having a central bore extending between said first and second ends;

a conduit member having a flow bore therethrough with a first terminus connected to said first end communicating said flow bore with said first bore and a second terminus adjacent said second end for communicating said flow bore with one of said second or third bores;

a yoke having an aperture therethrough for receiving said second terminus, said yoke being reciprocably mounted within said central bore adjacent said second end;

a guide disposed on said yoke and about said conduit member for flexing and elastically bending said conduit member and thereby laterally shifting said second terminus between a first position where said flowbore communicates with said second bore and a second position where said flowbore communicates with said third bore;

means for reciprocating said yoke to cause said guide to shift said conduit member between said first and second positions;

a seal member disposed on said second terminus for sealingly engaging said second end; and said seal member being movably disposed on said second terminus whereby said second terminus may be at an angle to said second end.

10. A bore selector comprising:
a housing having a first end with at least a first bore and a second end with at least second and third bores, said housing having a central bore extending between said first and second ends;

a conduit member having a flow bore therethrough with a first terminus connected to said first end communicating said flow bore with said first bore and a second terminus adjacent said second end for communicating said flow bore with one of said second or third bores;

a yoke having an aperture therethrough for receiving said second terminus, said yoke being reciprocably mounted within said central bore adjacent said second end;

a guide disposed on said yoke and about said conduit member for flexing and elastically bending said conduit member and thereby laterally shifting said second terminus between a first position where said flowbore communicates with said second bore and a second position where said flowbore communicates with said third bore;

means for reciprocating said yoke to cause said guide to shift said conduit member between said first and second positions;

a seal member disposed on said second terminus for sealingly engaging said second end; and said seal member including differential pressure areas allowing internal and external pressures to move said seal member into sealing engagement with said second end.

11. A bore selector comprising:
a housing having a first end with at least a first bore and a second end with at least second and third bores, said housing having a central bore extending between said first and second ends;

a conduit member having a flow bore therethrough with a first terminus connected to said first end communicating said flow bore with said first bore and a second terminus adjacent said second end for communicating said flow bore with one of said second or third bores;

a yoke having an aperture therethrough for receiving said second terminus, said yoke being reciprocably mounted within said central bore adjacent said second end;

a guide disposed on said yoke and about said conduit member for flexing and elastically bending said conduit member and thereby laterally shifting said second terminus between a first position where said flowbore communicates with said second bore and a second position where said flowbore communicates with said third bore;

means for reciprocating said yoke to cause said guide to shift said conduit member between said first and second positions;

a seal member disposed on said second terminus for sealingly engaging said second end; and said seal member including sealing means for sealingly engaging said second end and biasing means for biasing said sealing means against said second end.

12. The bore selector of claim 11 wherein said sealing means includes at least one metal ring disposed on said seal member.

13. The bore selector of claim 11 wherein said biasing means includes a plurality of belleville spring washers.

14. A bore selector comprising:
- a housing having a first end with at least a first bore and a second end with at least second and third bores, said housing having a central bore extending between said first and second ends;
- a conduit member having a flow bore therethrough with a first terminus connected to said first end communicating said flow bore with said first bore and a second terminus adjacent said second end for communicating said flow bore with one of said second or third bores;
- a yoke having an aperture therethrough for receiving said second terminus, said yoke being reciprocably mounted within said central bore adjacent said second end;
- a guide disposed on said yoke and about said conduit member for flexing and elastically bending said conduit member and thereby laterally shifting said second terminus between a first position where said flowbore communicates with said second bore and a second position where said flowbore communicates with said third bore;
- means for reciprocating said yoke to cause said guide to shift said conduit member between said first and second positions; and
- said yoke including upper and lower apertures for the passage of said conduit member therethrough and for allowing said conduit member to shift within said yoke, said yoke further including parallel sides on which said guide is disposed.

15. A bore selector comprising:
- a housing having a first end with at least a first bore and a second end with at least second and third bores, said housing having a central bore extending between said first and second ends;
- a conduit member having a flow bore therethrough with a first terminus connected to said first end communicating said flow bore with said first bore and a second terminus adjacent said second end for communicating said flow bore with one of said second or third bores;
- a yoke having an aperture therethrough for receiving said second terminus, said yoke being reciprocably mounted within said central bore adjacent said second end;
- a guide disposed on said yoke and about said conduit member for flexing and elastically bending said conduit member and thereby laterally shifting said second terminus between a first position where said flowbore communicates with said second bore and a second position where said flowbore communicates with said third bore;
- means for reciprocating said yoke to cause said guide to shift said conduit member between said first and second positions;
- a seal member disposed on said second terminus for sealingly engaging said second end; and
- said seal member including inner and outer seal grooves housing inner and outer metal seal rings.

16. The bore selector of claim 8 wherein said hydraulic actuator includes a balanced piston.

17. A bore selector comprising:
- a housing having a first end with at least a first bore and a second end with at least second and third bores, said housing having a central bore extending between said first and second ends;
- a conduit member having a flow bore therethrough with a first terminus connected to said first end communicating said flow bore with said first bore and a second terminus adjacent said second end for communicating said flow bore with one of said second or third bores;
- a yoke having an aperture therethrough for receiving said second terminus, said yoke being reciprocably mounted within said central bore adjacent said second end;
- a guide disposed on said yoke and about said conduit member for flexing and elastically bending said conduit member and thereby laterally shifting said second terminus between a first position where said flowbore communicates with said second bore and a second position where said flowbore communicates with said third bore;
- means for reciprocating said yoke to cause said guide to shift said conduit member between said first and second positions; and
- said hydraulic actuator including a piston and cylinder;
- said cylinder having upper and lower hydraulic ports adapted for connection to a source of hydraulic fluid under pressure for applying hydraulic pressure to said cylinder, said upper and lower hydraulic ports also relieving the fluid pressure upon the reciprocation of said piston within said cylinder, said cylinder also having upper and lower bypass ports;
- said piston including upper and lower relief valves, said lower relief valve being in communication with said upper bypass port upon said piston moving to an uppermost position within said cylinder and said upper relief valve being in communication with said lower bypass port upon said piston moving to a lowermost position within said cylinder;
- said lower relief valve being in the open position and said upper relief valve being in the closed position in said uppermost position, said lower relief valve allowing fluid pressure to bypass said piston in said uppermost position;
- said upper relief valve being in the open position and said lower relief valve being in the closed position in said lowermost position, said upper relief valve allowing the bypass of hydraulic fluid through said piston in said lowermost position;
- whereby the relief of the hydraulic pressure provides an indication of the reciprocation of said piston.

18. A bore selector comprising:
- a housing having a first end with at least a first bore and a second end with at least second and third bores, said housing having a central bore extending between said first and second ends;
- a metallic conduit member having a flow bore therethrough with a first terminus connected to said first end communication said flow bore with said first bore and a second terminus adjacent said second end for communicating said flow bore with one of said second or third bores; and
- flexing means being said conduit member to move said second terminus laterally within said central bore between a first position where said flow bore communicates with said second bore and a second position where said flow bore communicates with said third bore, said second terminus of said conduit member having guide means located about said conduit member for controlling said lateral motion.

* * * * *